No. 703,583. Patented July 1, 1902.
L. HIRT.
DEVICE FOR PACKING SLIDING GATE VALVES.
(Application filed Jan. 4, 1902.)
(No Model.) 2 Sheets—Sheet 1.

Witnesses
R. Aberli
John Lotka

Inventor
Ludwig Hirt
By Briesen & Knauth
his Attorneys.

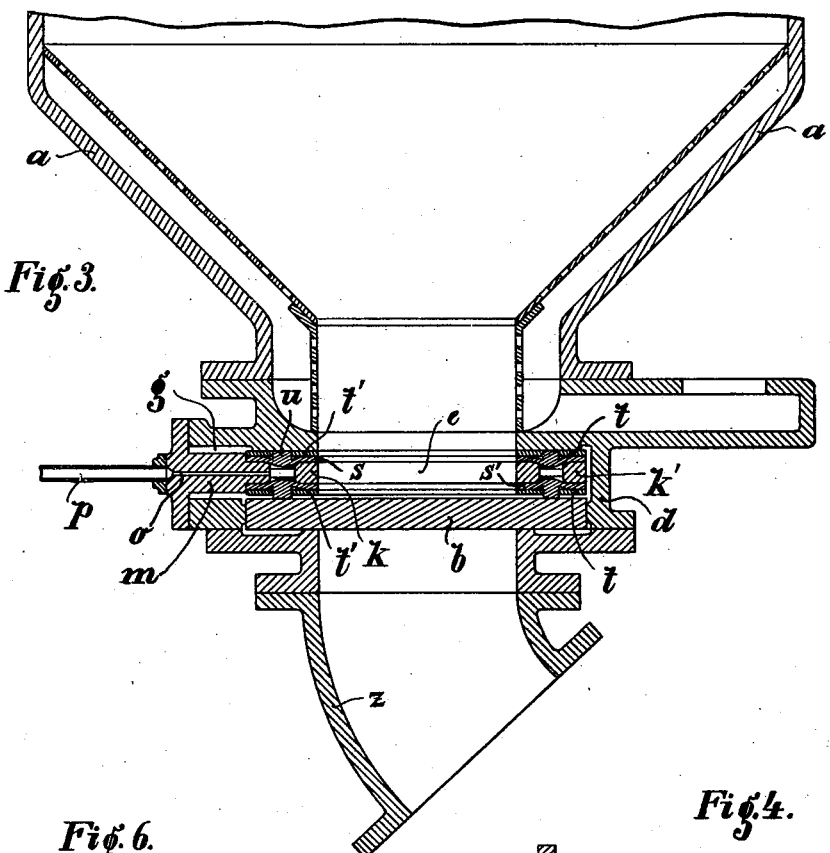

UNITED STATES PATENT OFFICE.

LUDWIG HIRT, OF GREVENBROICH, GERMANY, ASSIGNOR TO MASCHINEN-FABRIK GREVENBROICH, VORMALS LANGEN & HUNDHAUSEN, OF GREVENBROICH, GERMANY.

DEVICE FOR PACKING SLIDING GATE-VALVES.

SPECIFICATION forming part of Letters Patent No. 703,583, dated July 1, 1902.

Application filed January 4, 1902. Serial No. 88,373. (No model.)

*To all whom it may concern:*

Be it known that I, LUDWIG HIRT, a subject of the King of Prussia, Emperor of Germany, residing at Grevenbroich, Rhineprovince, Kingdom of Prussia, Germany, have invented certain new and useful Improvements in Devices for Packing Sliding Gate-Valves, of which the following is a specification.

My invention relates to devices for packing sliding gate-valves—e. g., those used for closing the discharge-openings of vessels—such, for instance, as diffusion vessels, which have to be closed firmly and securely, and yet be capable of being easily opened, and in which the tight fit between the closing valve or slide and the vessel and the valve-casing connected therewith is formed by a diaphragm or a plurality of diaphragms covering over an annular passage, which passage is filled with a fluid or gaseous pressure medium—such, for instance, as compressed air—for the purpose of pressing the diaphragm firmly on the passage.

My invention relates to an arrangement of such closing devices which allows of the diaphragm being easily changed without its being necessary to take apart the valve-casing.

Figure 1:
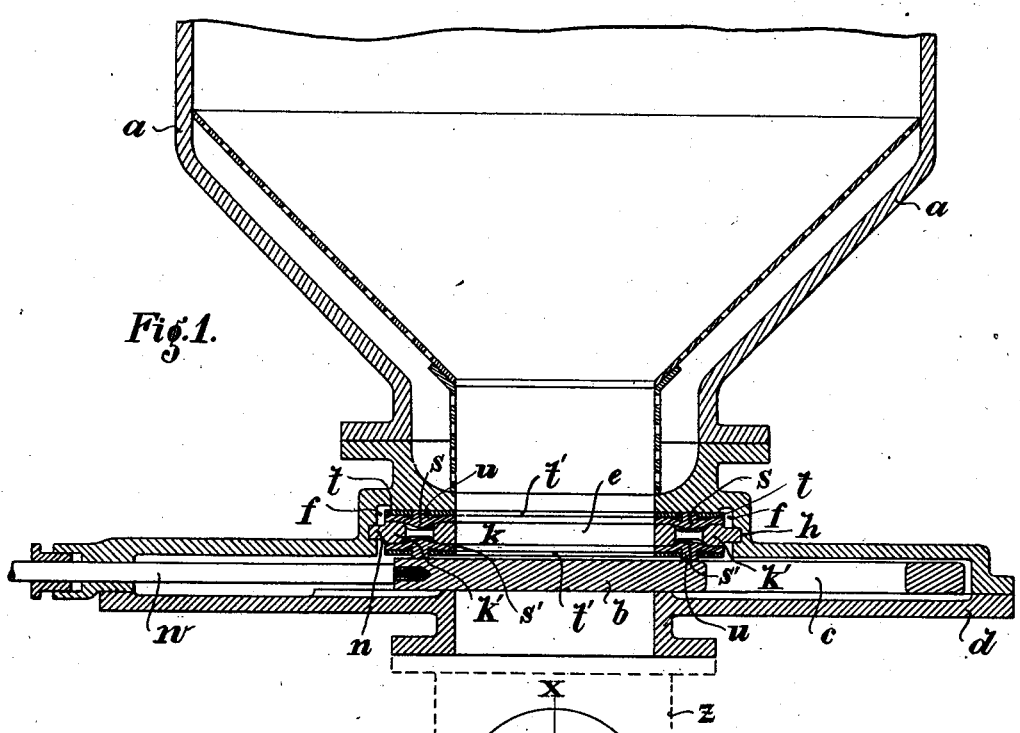
Figure 2:
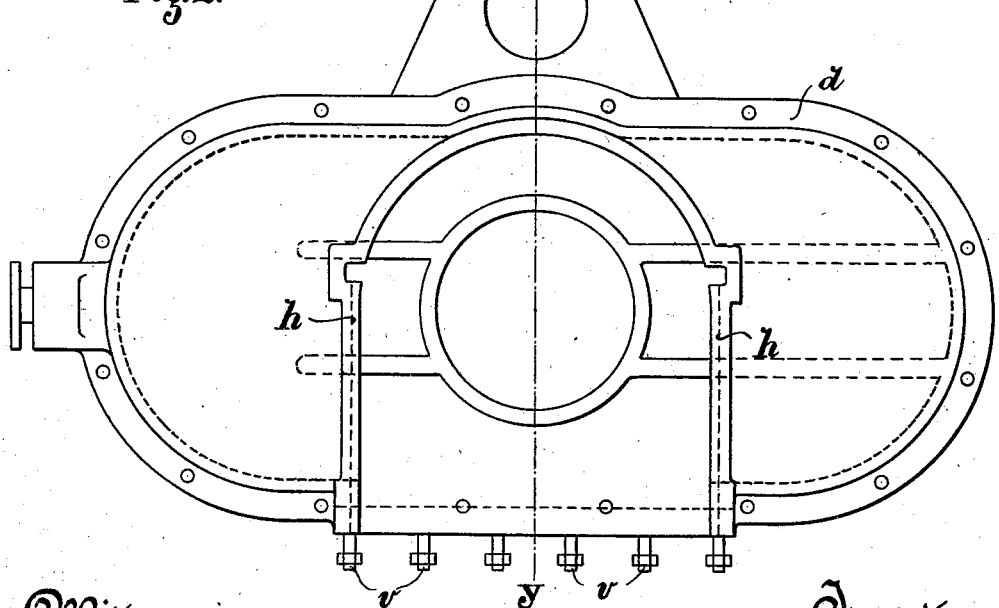

In the accompanying drawings, Figure 1 is a vertical section of the closing device in a vessel with a tapering bottom; Fig. 2, a plan view of the under part of the valve-casing; Fig. 3, a cross-section at right angles to the one shown in Fig. 1—that is to say, in the direction indicated by the dotted line $x\,y$ in Fig. 2; Fig. 4, a section of the insertion-piece carrying the packing diaphragms; Fig. 5, a plan view of same; Fig. 6, a section, on an enlarged scale, of a portion of the insertion-piece with the packing diaphragms.

The lower part of the vessel $a$ is made conical or tapering and provided beneath with a discharge-opening which may be opened and closed by means of a slide $b$. This slide has an aperture $c$ of a width corresponding to the outlet-opening of the vessel and is mounted in a casing $d$, which is firmly connected with the under part of the vessel $a$. An insertion-piece $e$, capable of being easily changed, is arranged in an annular recess $f$, situated in the upper part of the slide or valve casing, which recess opens outward in the form of a channel $g$ on one of the broad sides of the slide or valve casing. (See Fig. 3.) Grooves $h$, formed in the latter, serve for guiding the insertion-piece, which is shown more particularly in Figs. 4 and 5. This consists of two rings $k$ and $k'$, connected by bars $i$, which rings form between them an annular passage or channel $l$, interrupted only by the bars $i$. The clear diameter of the inner ring is similar in size to the discharge-opening of the vessel $a$ and the opening $c$ in the slide. To this annular part a frame-piece $m$ is attached by means of guide-bars $n$. In the frame-piece a passage $o$ is formed, which establishes the communication between the passage $l$ and the pipe $p$ for supplying the medium of pressure. The frame-piece has also a flange $q$ and is provided with handles $r$ for moving and conveying the entire insertion-piece.

Annular diaphragms $s\,s'$ are arranged above and below the rings, which diaphragms are held in engagement with the rings $k$ and $k'$ by means of pairs of rings $t\,t'$, placed thereon, which latter leave between them an interstice through which the thickened part or rib of the diaphragm $u$ projects, as shown in Fig. 6. The insertion-piece thus constituted is introduced into the recess $f$ of the slide-casing, the guide-bars $n$ moving in the guide-grooves $h$. The flange $q$ is then pressed tightly against the wall of the slide-casing by means of screws $v$.

On a pressure medium being introduced through the passage $o$ into the passage $l$ the lower diaphragm $s'$ is pressed on the closed slide $b$ and the upper diaphragm $s$ on the cover of the slide-casing $d$, thus producing a perfectly tight joint.

In order to change the insertion-piece, the screws $v$ are unfastened, whereupon the former can be withdrawn and replaced by another. The diaphragms may be thus easily and rapidly renewed or replaced. The movement of the slide is effected by means of a rod $w$ or in any other suitable manner, and the contents of the vessel are run off through a short pipe $z$ and a pipe connection attached thereto, which latter is, however, not shown in the drawings.

I declare that what I claim is—

1. In a device for packing sliding gate-valves, the combination with a slide situated in a casing, of an insertion-piece provided with packing-diaphragms and removably arranged in the slide-casing, with the object set forth.

2. In a device for packing sliding gate-valves, the combination with a slide situated in a casing, of an insertion-piece removably arranged in the slide-casing, which insertion-piece has two rings connected with one another by means of bars, which rings form a channel or passage adapted to be filled with a pressure medium, and closed above and below by packing-diaphragms.

In testimony whereof I have hereunto set my hand in presence of two subscribing witnesses.

LUDWIG HIRT.

Witnesses:
HERNANDO DE SOTO,
CARL KNOOP.